United States Patent
Sun et al.

(10) Patent No.: US 7,159,995 B2
(45) Date of Patent: Jan. 9, 2007

(54) DISPLAY DEVICE AND LIGHT SOURCE THEREFOR

(75) Inventors: Kai-Yu Sun, Jhudong Township, Hsinchu County (TW); Cheng-You Liu, Taipei (TW)

(73) Assignee: AU Optronics Corp., Hsinchu (TW)

( * ) Notice: Subject to any disclaimer, the term of this patent is extended or adjusted under 35 U.S.C. 154(b) by 123 days.

(21) Appl. No.: 10/939,680

(22) Filed: Sep. 13, 2004

(65) Prior Publication Data

US 2005/0276049 A1    Dec. 15, 2005

(30) Foreign Application Priority Data

Jun. 10, 2004   (TW) ............................... 93116660 A

(51) Int. Cl.
*F21S 4/00*   (2006.01)
(52) U.S. Cl. .................. 362/217; 439/226; 439/339
(58) Field of Classification Search ............... 362/217, 362/260; 439/226–244, 302, 306, 320, 339
See application file for complete search history.

(56) References Cited

U.S. PATENT DOCUMENTS

| | | | | |
|---|---|---|---|---|
| 2,282,325 A | * | 5/1942 | Epstein | .................. 315/56 |
| 5,069,633 A | * | 12/1991 | Straka et al. | ................ 439/271 |
| 5,568,009 A | * | 10/1996 | Gandhi | ................... 313/318.01 |
| 6,135,620 A | * | 10/2000 | Marsh | ......................... 362/377 |
| 6,168,282 B1 | * | 1/2001 | Chien | ........................... 362/84 |
| 6,494,730 B1 | * | 12/2002 | Yan | .............................. 439/226 |
| 2003/0161149 A1 | * | 8/2003 | Eaton, Jr. | ..................... 362/223 |
| 2004/0001340 A1 | | 1/2004 | Shin | |

FOREIGN PATENT DOCUMENTS

CN          1469170 A         1/2004

* cited by examiner

*Primary Examiner*—Renee Luebke
*Assistant Examiner*—Robert May
(74) *Attorney, Agent, or Firm*—Thomas, Kayden, Horstemeyer & Risley

(57) ABSTRACT

A display device and light source thereof. The light source is disposed in a housing. An electrode is connected to the light source. A first connecting portion having a first threaded surface is connected to the electrode. A second connecting portion having a second threaded surface is connected to an electric wire. The first threaded surface is electrically connected to the second threaded surface to connect the electric wire and the light source.

16 Claims, 4 Drawing Sheets

DISPLAY DEVICE AND LIGHT SOURCE THEREFOR

BACKGROUND

The invention relates to a display device, and in particular to a display device and a light source therefor.

FIG. 1A is a schematic view of a conventional liquid crystal display 1. FIG. 1B is a plan view of FIG. 1A. FIG. 1C is a local enlarged plan view of a dotted area IC of FIG. 1B, showing a lamp 14 and an electric wire 16.

The liquid crystal display 1 comprises a housing 10, a panel 12, a light source (lamp) 14, an electrode, and a wire 16. The panel 12 and the light source 14 are both disposed in the housing 10.

As shown in FIG. 1C, the electrode 18 is partially disposed in the light source 14 and partially protrudes therefrom. The electrode 18 is electrically connected to the wire 16. A solder 15 is applied thereto by a soldering hammer or welding iron (not shown) to connect the electrode 18 and the wire 16.

This connection presents disadvantages as follows.

During welding, an additional tool such as the welding iron must be applied to connect the electrode 18 and the wire 16, increasing manufacturing costs.

The welding technique requires considerable accuracy by skilled operators. If operators are not sufficiently skilled, a weld may be defective or incomplete. More seriously, incomplete cold welding may often be falsely detected as complete. Testing methods, such as by X-ray, have been developed to check defective welding.

Furthermore, since the lamp 14 has thin walls, at high temperatures produced during welding, heat may be directly transferred to a portion of the lamp 14 near the electrode 18. If the lamp 14 is exposed to high temperature over a long period of time, it may be cracked or broken, causing gas leakage if the lamp is a CCFL.

Moreover, since the electrode 18 is connected to the wire 16 by welding, and there are many lamps disposed in a backlight unit, if a lamp 14 is broken, it is very difficult to replace the broken lamp. Thus, reassembly of the backlight unit is also difficult.

SUMMARY

Embodiments of the invention provide a display device with a detachable light source such that an electric wire and an electrode thereof can be securely connected without the need for additional tools or special techniques.

Also provided is a light source for a display device comprising a first connecting portion and a second connecting portion. The first connecting portion having a first threaded surface is electrically connected to an electrode of a lamp. The second connecting portion having a second threaded surface is electrically connected to a wire. The first threaded surface is electrically connected to the second threaded surface.

The first connecting portion further comprises a groove with the first surface defined in the groove, and the second connecting portion further comprises a protrusion engaged with the groove.

The second surface may alternately be threaded, wherein the second connecting portion further comprises a groove, and the second surface is defined in the groove, and the first connecting portion further comprises a protrusion engaged with the groove.

The light source further comprises an insulating element covering the first connecting portion and the second connecting portion. The insulating element can comprise silicon rubber.

Embodiments of the invention further provide a display device comprising a housing, a lamp, an electrode, a first connecting portion, an electric wire, and a second connecting portion. The lamp is disposed in the housing. The electrode is connected to the lamp. The first connecting portion having a first threaded surface is connected to the electrode. The second connecting portion having a second threaded surface is connected to the electric wire. The first threaded surface is electrically connected to the second threaded surface to connect the electric wire and the lamp.

The first connecting portion is a screw or a nut with internal thread.

The second connecting portion can be a screw, a sleeve with internal thread, or a nut with internal thread. When the first connecting portion is a screw, the second connecting portion is a sleeve or a nut with internal thread corresponding to the screw. When the first connecting portion is a nut with internal thread, the second connecting portion is a screw corresponding to the nut.

The electrode and the first connecting portion are connected by welding or pressing or integrally formed.

The electric wire and the second connecting portion are connected by welding or pressing.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

Figure 1A:
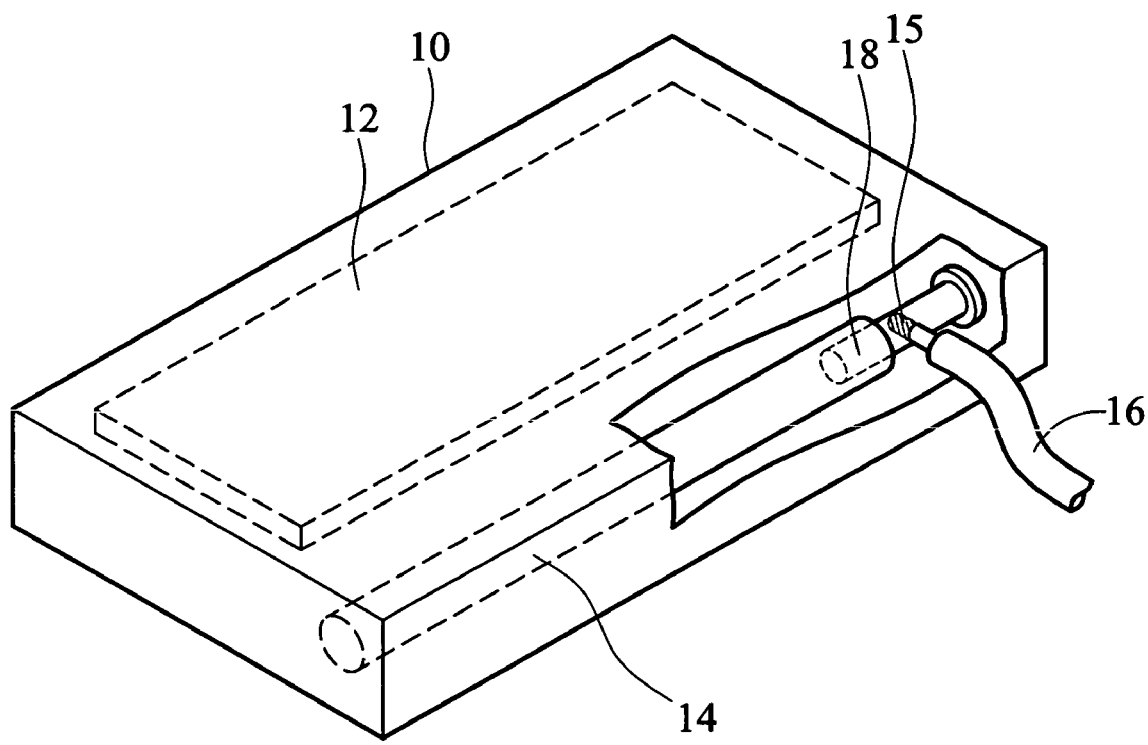
FIG. 1A is a schematic view of a conventional liquid crystal display.
Figure 1B:
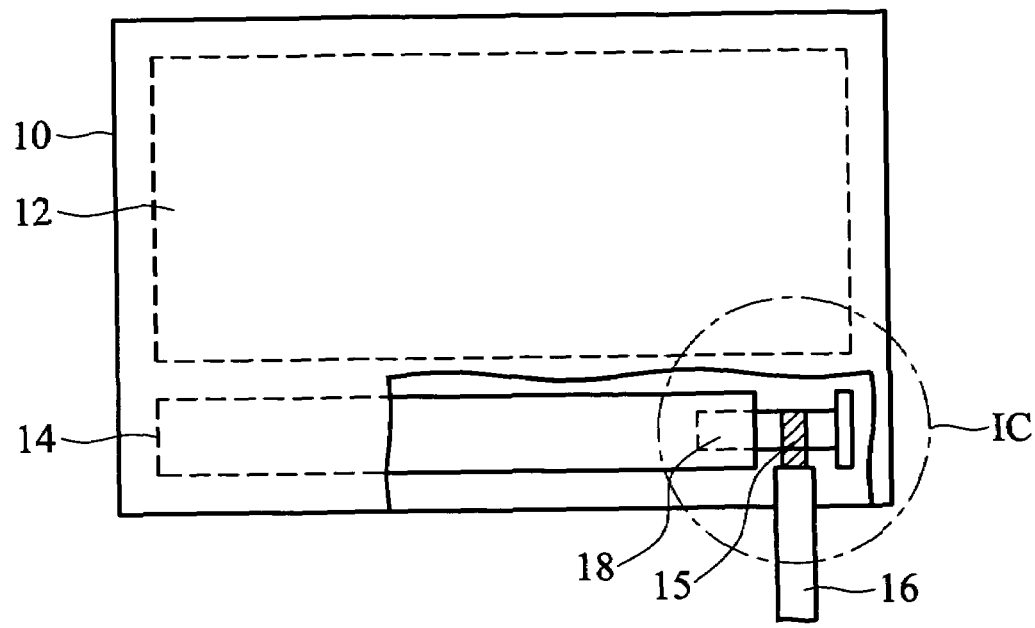
FIG. 1B is a plan view of FIG. 1A.
Figure 1C:
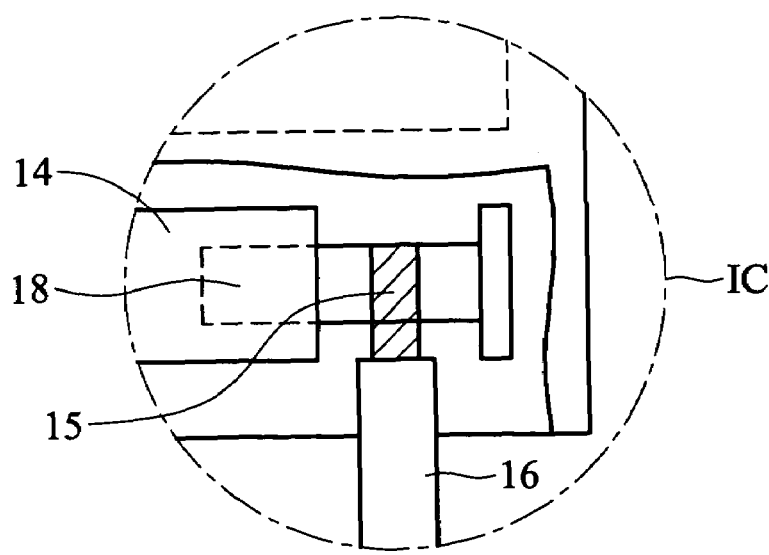
FIG. 1C is a local enlarged plan view of a dotted area IC of FIG. 1B, showing a lamp and an electric wire.
Figure 2A:
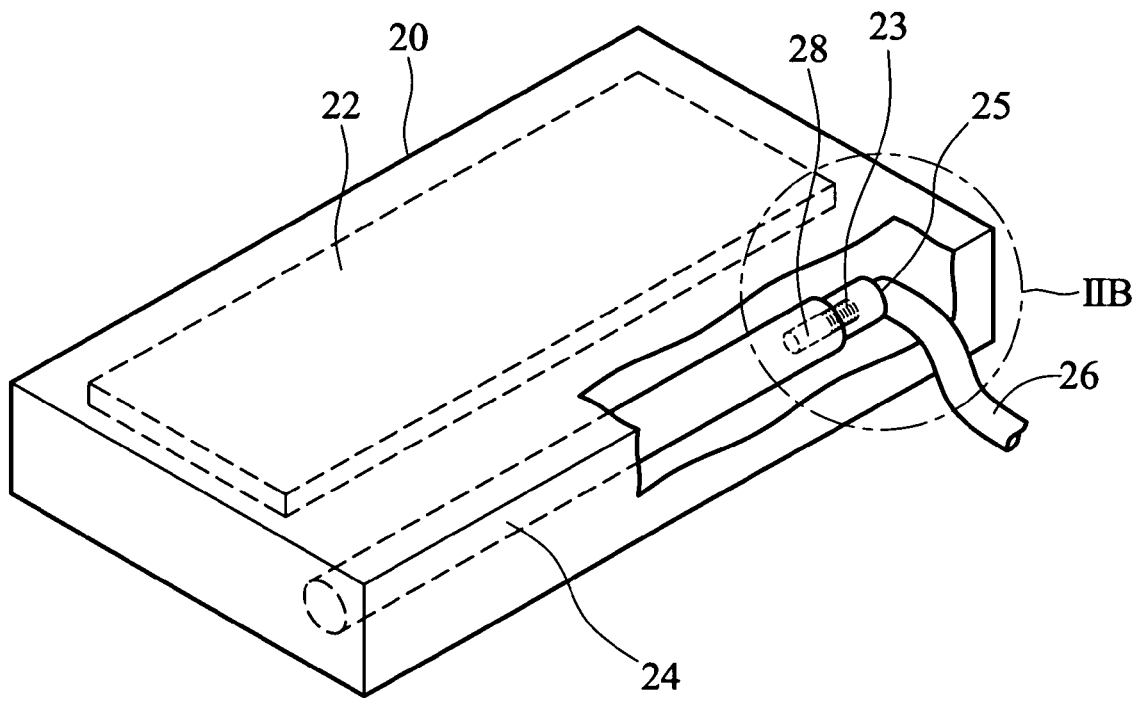
FIG. 2A is a schematic perspective view of a liquid crystal display according to embodiments of the invention.
Figure 2B:
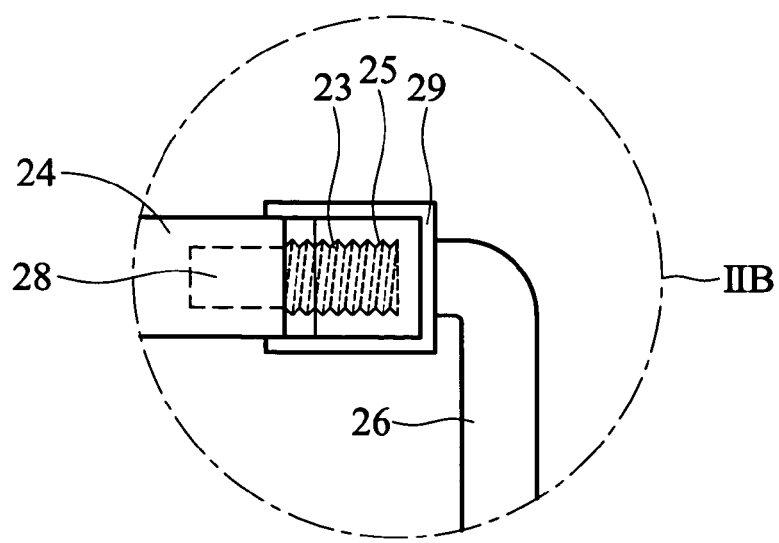
FIG. 2B is a local enlarged view of a dotted area IIB of FIG. 2A, showing a lamp and an electric wire.

FIG. 2A is a schematic perspective view of a liquid crystal display 2 according to embodiments of the invention. FIG. 2B is a local enlarged view of a dotted area IIB of FIG. 2A, showing a lamp 24 having an outer surface 240$f$, and an electric wire 26 of a detachable light source. The lamp 24 can be a cold cathode fluorescent lamp. While only on lamp 24 is shown as an example; the invention is not limited by the number of lamps or wires disposed.

As shown in FIG. 2A, the display device 2 comprises a housing 20, a panel 22, a light source (lamp) 24, an electrode 28, an electric wire 26, a first connecting portion 23, and a second connecting portion 25. A first conjunction surface 230$e$1 is a first shoulder formed between the first connecting portion 23 and the lamp 24. The panel 22 and the lamp 24 are both disposed in the housing 20. The lamp 24, the electrode 28, and the electric wire 26 constitute a detachable light source, as shown in FIG. 2B. The first connecting portion 23 is connected to the electrode 28. The second connecting portion 25 is connected to the electric wire 26. The electrode 28 and the lamp 24 are electrically connected. The wire 26 protrudes from the housing 20. The second connecting portion 25 is located at an end of the electric wire 26. The first connecting portion 23 is connected to the second connecting portion 25 to connect the lamp 24 and the electric wire 26, providing power to the lamp 24.

First Embodiment

Figure 3A:
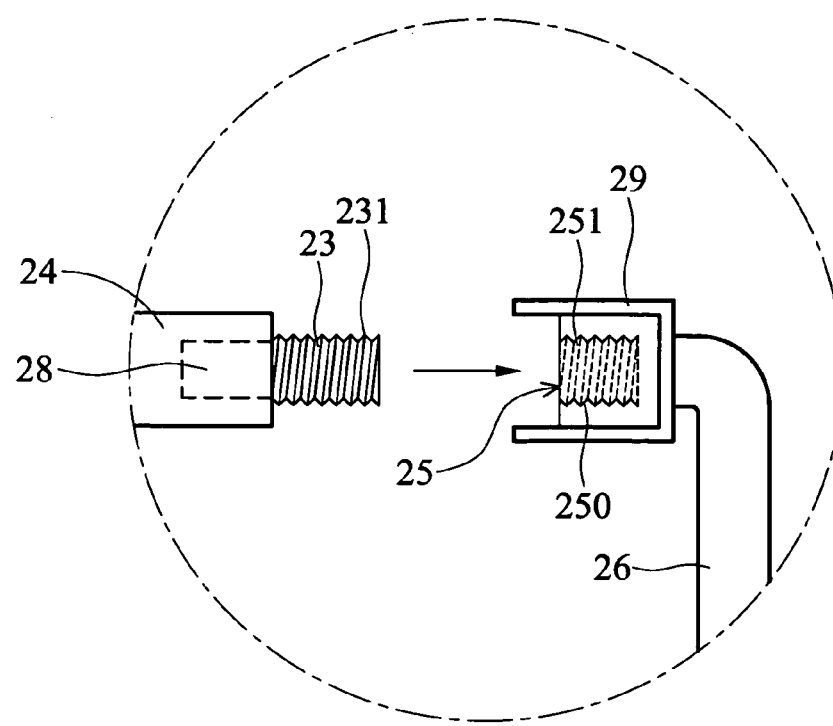
FIG. 3A is a local enlarged view of the detachable light source according to a first embodiment of the invention.

FIG. 3A is a local enlarged view of the lamp 24 and the electric wire 26 of the detachable light source according to a first embodiment of the invention. In this embodiment, the first connecting portion 23 is a screw, comprising a first threaded surface 231. The second connecting portion 25 comprises a groove 250. The groove 250 comprises a second threaded surface 251. Namely, the second connecting portion 25 is a sleeve or a nut with internal thread 251. An insulating element 29 comprises a recess 290 and a contact surface 290f, and a second conjunction surface 250e1 is a second shoulder formed between the second connecting portion 25 and the insulating element 29. The second connecting portion 25 is received by the recess 290, and the contact surface 290f of the insulating element 29 covers on the outer surface 240f of the lamp 24 and a conjunction region ci formed by the first conjunction surface 230e1 and the second conjunction surface 250e1 when the first threaded surface 231 is connected to the second threaded surface 251. Thus, the conjunction region cl formed by the first conjunction surface 230e1 and the second conjunction surface 250e1 is isolated from an exterior by the insulating element 29. The insulating element 29 can comprise silicon rubber, thereby preventing current leakage. The invention is not limited by the shape of the first and second connecting portions 23, 25.

Before assembling the lamp 24 and the electric wire 26, the electrode 28 is attached to the first connecting portion 23. The electrode 28 and the first connecting portion 23 are connected by welding or pressing or integrally formed. The electric wire 26 and the second connecting portion 25 are connected by welding or pressing. After the electric wire 26 and the second connecting portion 25 are connected, the insulating element 29 covers both first and second connecting portions 23 and 25, preventing current leakage.

Since the first connecting portion 23 is a screw and the second connecting portion 25 is a nut with internal thread, the electrode 28 and the electric wire 26 are connected by engaging the screw and the nut to securely connect or easily detach the lamp 24 and the electric wire 26.

Second Embodiment

Figure 3B:
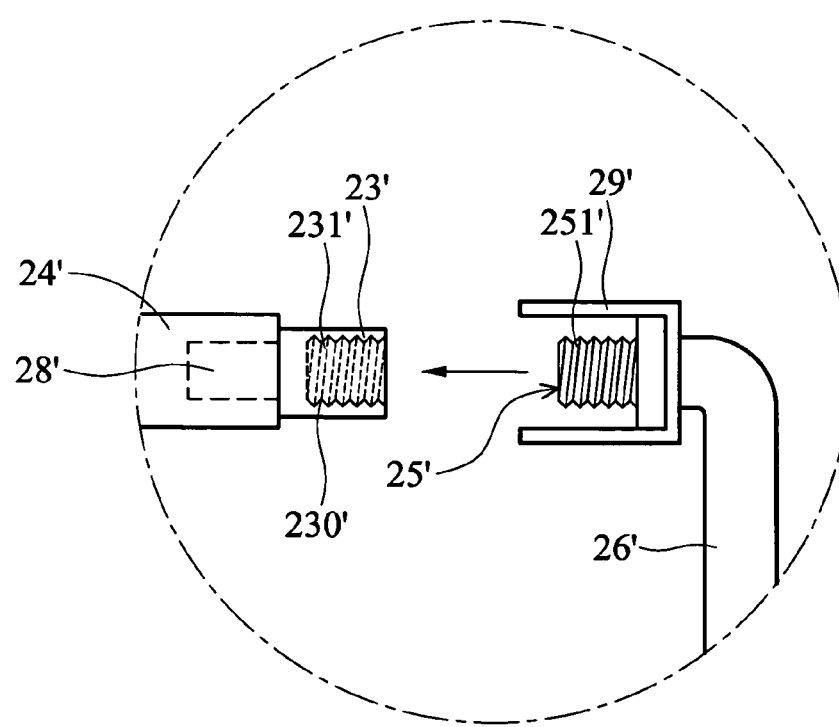
FIG. 3B is a local enlarged view of the detachable light source according to a second embodiment of the invention.

FIG. 3B is a local enlarged view of the lamp 24' and the electric wire 26' of a detachable light source according to a second embodiment of the invention. In this embodiment, the first connecting portion 23' comprises a groove 230' with a threaded surface 231'. That is, the first connecting portion 23' is a nut with internal thread 231'. The second connecting portion 25' is a protrusion comprising a threaded surface 251', such as a screw. An insulating element 29' covers the second connecting potion 25'. The insulating element 29 comprises silicon rubber or other similar material to protect the connection between the first and second connecting portions 23' and 25', thereby preventing current leakage.

Before assembling the lamp 24' and the electric wire 26', the electrode 28' is attached to the first connecting portion 23'. The electrode 28' and the first connecting portion 23' are connected by welding or pressing or integrally formed. The electric wire 26' and the second connecting portion 25' are connected by welding or pressing. The insulating element 29' covers the second connecting portions 25'. When the electric wire 26' and the second connecting portion 25' are connected, the insulating element 29' prevents current leakage.

Since the first connecting portion 23' is a nut with internal thread, and the second connecting portion 25' is a screw, the electrode 28' and the electric wire 26' are connected by engaging the screw and the nut to securely connect or easily detach the light source 24' and the electric wire 26'.

The display device and detachable light source therefor according to embodiments of the invention require no additional tools or special techniques during assembly, being easily assembled by hand.

The connection between the lamp and the wire is achieved by engaging the first and the second connecting portions, such that assembly of the light source can be processed at room temperature, preventing lamp breakage from welding high temperatures.

Further, the light source is assembled by screwing, thereby providing lower resistance.

Different combinations of engagement between the first and second connecting portions are possible. The first and second connecting portions are rotably connected to or detached from each other, simplifying reassembly.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light source for a display device, comprising:
   a first connecting portion having a first threaded surface, the first connecting portion electrically connected to an electrode of a lamp;
   a second connecting portion electrically connected to a wire, having a second threaded surface electrically connected to the first threaded surface to form a conjunction region therebetween;
   an insulating element enclosing the second connecting portion, comprising a contact surface covering on the conjunction region when the first threaded surface is electrically connected to the second threaded surface, so that the conjunction region is isolated from an exterior;
   a first shoulder formed between the first connecting portion and the lamp; and
   a second shoulder formed between the second connecting portion and the insulating element;
   when the first threaded surface is connected to the second threaded surface, the conjunction region is formed by the first shoulder and the second shoulder.

2. The light source for a display device as claimed in claim 1, wherein the lamp comprises a cold cathode fluorescent lamp.

3. The light source for a display device as claimed in claim 1, wherein the first connecting portion further comprises a groove, and the first threaded surface is defined in the groove, and the second connecting portion further comprises a protrusion engaged with the groove.

4. The light source for a display device as claimed in claim 1, wherein the second connecting portion further comprises a groove, and the second threaded surface is defined in the groove, and the first connecting portion further comprises a protrusion engaging the groove.

5. The light source for a display device as claimed in claim 1, wherein the insulating element comprises silicon rubber.

6. A display device, comprising:
a housing;
a lamp, disposed in the housing;
an electrode, connected to the lamp;
a first connecting portion, having a first threaded surface, the first connecting portion electrically connected to the electrode;
an electric wire, protruding from the housing; and
a second connecting portion electrically connected to the electric wire, having a second threaded surface connected to the second threaded surface to form a conjunction region;
an insulating element, enclosing the second connecting portion and covering on the conjunction region when the first threaded surface is electrically connected to the second threaded surface, so that the electric wire connects to the lamp;
a first shoulder formed between the first connecting portion and the lamp; and
a second shoulder formed between the second connecting portion and the insulating element;
when the first threaded surface is connected to the second threaded surface, the conjunction region is formed by the first shoulder and the second shoulder.

7. The display device as claimed in claim 6, wherein the first connecting portion is a screw or a nut with internal thread.

8. The display device as claimed in claim 6, wherein the second connecting portion is a screw, a sleeve with internal thread, or a nut with internal thread, such that, when the first connecting portion is a screw, the second connecting portion is a sleeve or nut with internal thread corresponding to the screw, and when the first connecting portion is a nut with internal thread, the second connecting portion is a screw corresponding thereto.

9. The display device as claimed in claim 6, wherein the insulating element comprises silicon rubber.

10. The display device as claimed in claim 6, wherein the electrode and the first connecting portion are connected by welding or pressing.

11. The display device as claimed in claim 6, wherein the electrode and the first connecting portion are integrally formed.

12. The display device as claimed in claim 6, wherein the electric wire and the second connecting portion are connected by welding or pressing.

13. The display device as claimed in claim 6, wherein the lamp comprises a cold cathode fluorescent lamp.

14. A light source, comprising:
a lamp comprising an electrode;
a wire;
a first connecting portion electrically connected to the electrode, comprising a first threaded surface;
a second connecting portion electrically connected to the wire, comprising a second threaded surface electrically connected to the first threaded surface;
an insulating element comprising a recess and a contact surface, wherein the recess receives the second connecting portion and the contact surface covers conjunction region of the first connecting portion and the second connecting portion when the first threaded surface is connected to the second threaded surface, so that the conjunction region of the first connecting portion and the second connecting portion is isolated from an exterior by the insulating element;
a first shoulder formed between the first connecting portion and the lamp; and
a second shoulder formed between the second connecting portion and the insulating element;
when the first threaded surface is connected to the second threaded surface, the conjunction region is formed by the first shoulder and the second shoulder.

15. The light source as claimed in claim 14, wherein the insulating element comprises an U-shaped section, and the contact surface of the insulating element is an inner wall of the recess.

16. The light source as claimed in claim 14, wherein the lamp further comprises an outer surface, and the contact surface of the insulating element contacts the outer surface of the lamp when the first threaded surface is connected to the second threaded surface.

* * * * *